United States Patent
Notsu et al.

(10) Patent No.: US 7,990,454 B2
(45) Date of Patent: Aug. 2, 2011

(54) PHASE ADJUSTMENT DEVICE CAPABLE OF HIGH SPEED OPERATION AND DIGITAL CAMERA UTILIZING THE SAME

(75) Inventors: Takuma Notsu, Osaka (JP); Kenji Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 434 days.

(21) Appl. No.: 12/139,715

(22) Filed: Jun. 16, 2008

(65) Prior Publication Data
US 2008/0309787 A1 Dec. 18, 2008

(30) Foreign Application Priority Data
Jun. 15, 2007 (JP) .................................. 2007-158502

(51) Int. Cl.
*H04N 3/14* (2006.01)
*H04N 5/228* (2006.01)

(52) U.S. Cl. ...................... 348/312; 348/222.1; 348/294

(58) Field of Classification Search .................. 348/234, 348/312
See application file for complete search history.

(56) References Cited

U.S. PATENT DOCUMENTS

| 5,406,329 | A | * | 4/1995 | Kashimura et al. | 348/175 |
| 6,593,871 | B1 | * | 7/2003 | Miethig et al. | 341/157 |
| 7,545,427 | B2 | * | 6/2009 | Tokunaga | 348/312 |
| 7,667,737 | B2 | * | 2/2010 | Morimoto et al. | 348/222.1 |
| 7,796,176 | B2 | * | 9/2010 | Mimata et al. | 348/312 |
| 7,936,387 | B2 | * | 5/2011 | Morita et al. | 348/255 |
| 2007/0211839 | A1 | * | 9/2007 | Suda | 375/354 |

FOREIGN PATENT DOCUMENTS
JP 2005-151081 * 6/2005

* cited by examiner

*Primary Examiner* — Ngoc-Yen Vu
(74) *Attorney, Agent, or Firm* — McDermott Will & Emery LLP

(57) ABSTRACT

In a phase adjustment device according to the present invention, a first luminance level detector detects a luminance level of a digital imaging signal in a first pixel region, a second luminance level detector detects a luminance level of the digital imaging signal in a second pixel region, a data comparator compares detection results by the first and second luminance level detectors, an adjustment judger judges if it is necessary to adjust a phase of a pulse based on a result of the comparison by the data comparator, a timing adjuster shifts the phase of the pulse in the second pixel region when the luminance levels are detected, and further, the timing adjuster adjusts the phase of the pulse when the judgment by the adjustment judger indicates that the phase adjustment is necessary.

38 Claims, 10 Drawing Sheets

PHASE ADJUSTMENT DEVICE CAPABLE OF HIGH SPEED OPERATION AND DIGITAL CAMERA UTILIZING THE SAME

BACKGROUND OF THE INVENTION

1. Field of the Invention

The present invention relates to a phase adjustment device for adjusting a phase (timing) of a pulse used for obtaining an image in a digital camera and a digital camera provided with the phase adjustment device.

2. Description of the Related Art

A digital camera (digital still camera, digital video camera, mobile telephone provided with a camera and the like) is configured such that an analog imaging signal obtained by an imaging element such as CCD or an MOS sensor is converted into a digital imaging signal, and the converted digital imaging signal is subjected to predetermined processing and then recorded. In order to obtain an image of a photographic subject using the imaging element, a pulse for driving the imaging element and a pulse for detecting a signal level are necessary. The phases (timings) of these pulses cannot be easily adjusted in a hardware designing process due to some variability generated in a manufacturing process. Therefore, the phase adjustment is performed by an engineer after the manufacturing process, and information relating to the adjusted phases (phase information) is stored in a memory region. At the time of actual use, the phase information is read from the memory region, and the phases are optimally set based on the read phase information.

In the field of a hospital-use camera, it may be necessary to exchange an imaging element. When an imaging element is replaced with another, the phase of the driving pulse is inevitably changed. Therefore, the phase adjustment is performed again. However, the imaging element cannot be easily exchanged in the case where an engineer has to readjust the phases.

FIG. 11 shows an example of a conventional phase adjustment device which successfully solved the foregoing problem. Referring to reference symbols shown in FIG. 11, 1 denotes an optical lens, 2 denotes an imaging element such as CCD (Charged Coupled Device), 3 denote a correlated double sampling unit, 4 denotes an automatic gain controller, 5 denotes an AD converter, 6 denotes a timing generator, 7 denotes a vertical driver, 10 denotes an analog front end, 20 denotes a DSP (Digital Signal Processor), 31 denotes a memory (SDRAM), 32 denotes a luminance level detector, 33 denotes a dispersion calculator, 34 denotes a timing adjuster, Sa denotes an analog imaging signal, and Sd denotes a digital imaging signal.

Whenever a phase optimal for conditions is changed due to environmental changes such as temperature change at the time of actual use, it is necessary to performance phase adjustment. The phase adjustment is performed mainly by the luminance level detector 32, dispersion calculator 33 and timing adjuster 34.

The luminance level detector 32 detects a luminance level in the digital imaging signal Sd of a plurality of pixels in a first pixel region for which the luminance level is to be detected, and supplies the detected luminance level to the timing adjuster 34. The timing adjuster 34 performs the phase adjustment of a pulse based on the received luminance level. More specifically, the timing adjuster 34 performs the phase adjustment for a peak sample pulse DS2 for sampling a signal component which peaks in a signal period and a reference sample pulse DS1 for sampling a signal component which is used as a reference in the correlated double sampling.

The dispersion calculator 33 calculates dispersion showing signal variability among a plurality of pixels in a second pixel region. The dispersion calculator 33 supplies the calculated dispersion to the timing adjuster 34. The timing adjuster 34 further performs the phase adjustment of a pulse based on the received dispersion. More specifically, the timing adjuster 34 performs the phase adjustment for an AD clock signal ACK which is an operation clock when the analog imaging signal Sa is AD-converted into the digital imaging signal Sd.

In recent years, however, the pulse which drives the imaging element increases its speed as the number of the pixels in the imaging element is increased, which makes it difficult to optimally adjust the driving and detection pulses. This recent trend created a new problem that a moving image cannot be obtained within a time range allowed for to perform the phase adjustment in a signal processing. Without the conventional technology quoted earlier or the conventional technology recited in the disclosed Japanese Patent Document (No. 2005-151081 of the Japanese Patent Applications Laid-Open), it is difficult to perform the phase adjustment in real time while obtaining images.

SUMMARY OF THE INVENTION

Therefore, a main object of the present invention is to provide a phase adjustment device which is capable of a high-speed operation in the case where an optimal phase is changed due to environmental changes such as temperature change and which performs phase adjustment in real time while obtaining a moving image, whereby coping with such a recent trend as high speed of a driving pulse resulting from an increase in the number of pixels.

In order to achieve the foregoing object, a phase adjustment device according to the present invention is a phase adjustment device for adjusting a phase of a pulse used in an imaging element based on a digital imaging signal obtained when an analog imaging signal outputted from the imaging element is converted into a digital value for each pixel, comprising:

a first luminance level detector for detecting a luminance level of the digital imaging signal obtained from the analog imaging signal outputted from a plurality of pixels in a first pixel region of the imaging element;

a second luminance level detector for detecting a luminance level of the digital imaging signal obtained from the analog imaging signal outputted from a plurality of pixels in a second pixel region of the imaging element;

a data comparator for comparing a result of the detection by the first luminance level detector and a result of the detection by the second luminance level detector;

an adjustment judger for judging if the phase adjustment for the pulse is necessary based on a result of the comparison by the data comparator; and a timing adjuster for shifting the phase of the pulse in the second pixel region when the luminance levels are detected, wherein the timing adjuster adjusts the phase of the pulse when the judgment by the adjustment judger indicates that the phase adjustment is necessary.

According to the foregoing constitution, the first luminance level detector detects the luminance level in the digital imaging signal of the plurality of pixels in the first pixel region, and supplies the obtained luminance level to the data comparator, and the second luminance level detector detects the luminance level in the digital imaging signal of the plurality of pixels in the second pixel region, and supplies the obtained luminance level to the data comparator. The data comparator compares the first and second luminance levels, and supplies the comparison result (luminance level difference) to the adjustment judger. The adjustment judger judges if the phase adjustment is necessary based on an amplitude of the luminance level difference. More specifically, the adjustment judger judges the phase adjustment to be unnecessary in the case where the luminance level difference is beyond an adjustment target range, and judges the phase adjustment to be necessary in the case where the luminance level difference is within the adjustment target range.

The first and second pixel regions are preferably close to each other. For example, the first pixel region is an arbitrary line in an image, while the second pixel region is a line adjacent to that of the first pixel region. Thus constituted, the luminance levels obtained from the first and second pixel regions should be substantially equal to each other. An optimal phase is set in the first pixel region, while a phase slightly shifted from that of the first pixel region is set in the second pixel region. When the luminance levels in the first and second pixel regions are detected by the first and second luminance level detectors under such conditions, a variation amount of the luminance level detected by the second luminance level detector is larger than a variation amount of the luminance level detected by the first luminance level detector in the case where the phase of the analog imaging signal is shifted from the optimal phase due to some reason. The variation amounts are thus different because while the optimal phase was set in the first pixel, the phase was shifted from the optimal phase in the second pixel region. More specifically, in the case where the phase of the analog imaging signal is shifted in a direction opposite to a direction of the shift from the optimal phase in the second region, the shift of the phase is increased, and the detected luminance level may largely change. In the case where the phase of the analog imaging signal is shifted in the same direction as the shift from the optimal phase in the second region, the shift of the phase in the second pixel region alleviates the shift of the phase of the analog imaging signal. Therefore, it is probable that the variation of the detected luminance level is not very large. Therefore, the direction and the amount of the phase shift of the analog imaging signal can be measured through the judgment made when the phase is shifted forward and backward in the second pixel region with respect to the optimal phase in the first pixel region.

The timing adjuster, upon receipt of the judgment result from the adjustment judger indicating that the phase adjustment is necessary, calculates the optimal phase of the pulse and instructs a timing generator and the like to set the optimal phase. The phase adjustment for a pulse based on the luminance levels is suitable for, for example, the phase adjustment for a peak sample pulse for sampling a signal component which peaks in a signal period, and the phase adjustment for a reference sample pulse for sampling a signal component which is used as a reference in correlated double sampling.

The phase adjustment thus described is automatically performed cooperatively by the luminance level detector, data comparator, adjustment judger and timing adjuster. Further, the luminance level detector actually measures the luminance level in the analog imaging signal obtained from the imaging element and adjusts the phase of the pulse in consideration of the measured luminance level. As a result, the adjustment of the phase of the pulse for driving the imaging element can be very accurate, in other words, the phase adjustment immediately responding to the current status of the imaging element can be realized. Further, each phase of the pulse for driving the imaging element is automatically adjusted, which favorably reduces an amount of time necessary for the phase adjustment in comparison to the phase adjustment manually performed by an engineer.

The foregoing constitution, wherein the phase of the pulse to be phase-adjusted is slightly shifted in the second pixel region, is particularly advantageous in that it can respond to a case, with a high-speed operation, where the phase optimal for conditions in an actual use changes due to environmental changes such as temperature change. Therefore, the phase adjustment can be performed in real time while the moving image is being obtained in the imaging operation so as to cope with a speed of driving pulses which become faster as the number of pixels increases.

The phase adjustment device thus constituted according to the present invention may be provided with a first dispersion calculator and a second dispersion calculator constituted as described below in place of the first and second luminance level detectors.

A phase adjustment device according to the present invention is a phase adjustment device for adjusting a phase of a pulse used in an imaging element based on a digital imaging signal obtained when an analog imaging signal outputted from the imaging element is converted into a digital value for pixel, comprising:

a first dispersion calculator for calculating dispersion showing signal variability of the digital imaging signal obtained from the analog imaging signal outputted from a plurality of pixels in a first pixel region of the imaging element;

a second dispersion calculator for calculating dispersion showing signal variability of the digital imaging signal obtained from the analog imaging signal outputted from a plurality of pixels in a second pixel region of the imaging element;

a data comparator for comparing a result of the calculation by the first dispersion calculator and a result of the calculation by the second dispersion calculator;

an adjustment judger for judging if the phase adjustment for the pulse is necessary based on a result of the comparison by the data comparator; and a timing adjuster for shifting the phase of the pulse in the second pixel region when the dispersions are calculated, wherein the timing adjuster adjusts the phase of the pulse when the judgment by the adjustment judger indicates that the phase adjustment is necessary.

The phase adjustment device thus constituted according to the present invention may be provided with a first dispersion calculator and a second dispersion calculator constituted as described below along with the first and second luminance level detectors.

A phase adjustment device according to the present invention is a phase adjustment device for adjusting a phase of a pulse used in an imaging element based on a digital imaging signal obtained when an analog imaging signal outputted from the imaging element is converted into a digital value for each pixel, comprising:

a first luminance level detector for detecting a luminance level of the digital imaging signal obtained from the analog imaging signal outputted from a plurality of pixels in a first pixel region of the imaging element;

a second luminance level detector for detecting a luminance level of the digital imaging signal obtained from the analog imaging signal outputted from a plurality of pixels in a second pixel region of the imaging element;

a first dispersion calculator for calculating dispersion showing signal variability of the digital imaging signal obtained from the analog imaging signal outputted from the plurality of pixels in the first pixel region of the imaging element;

a second dispersion calculator for calculating dispersion showing signal variability of the digital imaging signal obtained from the analog imaging signal outputted from the plurality of pixels in the second pixel region of the imaging element;

a data comparator for comparing a result of the detection by the first luminance level detector and a result of the detection by the second luminance level detector, the data comparator further comparing a result of the calculation by the first dispersion calculator and a result of the calculation by the second dispersion calculator;

an adjustment judger for judging if the phase adjustment for the pulse is necessary based on results of the comparison by the data comparator; and a timing adjuster for shifting the phase of the pulse in the second pixel region when the luminance levels are detected and the dispersions are calculated, wherein the timing adjuster adjusts the phase of the pulse when the judgment by the adjustment judger indicates that the phase adjustment is necessary.

In the constitution wherein the first and second dispersion calculators are provided, the first dispersion calculator calculates the signal variability of the digital imaging signal in the plurality of pixels in the first pixel region, and supplies the obtained dispersion data to the data comparator. Further, the second dispersion calculator calculates the signal variability of the digital imaging signal in the plurality of pixels in the second pixel region, and supplies the obtained dispersion data to the data comparator. The data comparator compares the first signal variability and the second signal variability, and supplies the comparison result (dispersion difference) to the adjustment judger. The adjustment judger judges an amplitude of the dispersion difference and judges if the phase adjustment is necessary. The phase adjustment is judged to be unnecessary in the case where the dispersion difference is beyond an adjustment target range, while the phase adjustment is judged to be necessary in the case where the dispersion difference is within the adjustment targeted range. The rest of the constitution is the same as described above concerning the luminance levels. The phase adjustment for the pulse based on the dispersion difference is suitable for, for example, the phase adjustment for an AD clock signal which is an operation clock used when the analog imaging signal is AD-converted into the digital imaging signal.

In the case where the luminance level is calculated and the signal variability is calculated, the phase adjustment for the peak sample pulse or the reference sample pulse and the phase adjustment for the AD clock signal can be accurately performed.

In either of the phase adjustment device provided with the first and second luminance level detectors and the phase adjustment device provided with the first and second dispersion calculators, the judgment is made on the phase shift through the comparison of the data values in the first and second pixel regions. The phase of a phase-adjustment target pulse is slightly shifted in the second pixel region. Therefore, the phase adjustment device can respond to a case, with a high-speed operation, where the phase which is optimal for conditions in an actual use changes due to environmental changes such as temperature change. Therefore, the phase adjustment can be performed in real time while the moving image is being obtained in the imaging operation so as to cope with a speed of driving pulses which become faster as the number of pixels increases.

The phase adjustment device according to the present invention may further comprise a histogram calculator for detecting a luminance level distribution in the first pixel region and a luminance level distribution in the second pixel region and supplying a result of the detection to the first and second luminance level detectors.

According to the foregoing constitution, the luminance level distributions in the first and second pixel regions are detected and supplied to the first and second luminance level detectors by the histogram calculator. Therefore, the phase adjustment for the pulse can be controlled in a more detailed manner.

The phase adjustment device according to the present invention may further comprise a histogram calculator for detecting a luminance level distribution in the first pixel region and a luminance level distribution in the second pixel region and supplying a result of the detection to the first and second dispersion calculators.

According to the foregoing constitution, the luminance level distributions in the first and second pixel regions are detected and supplied to the first and second dispersion calculators by the histogram calculator. Therefore, the phase adjustment for the pulse can be controlled in a more detailed manner.

The phase adjustment device according to the present invention may further comprise a block memory for storing therein an integration result or an average result of the digital imaging signal obtained from the analog imaging signal outputted from at least one of the first and second pixel regions and supplying the integration result or the average result stored therein to the first and second luminance level detectors.

The phase adjustment device according to the present invention may further comprise a block memory for storing therein an integration result or an average result of the digital imaging signal obtained from the analog imaging signal outputted from at least one of the first and second pixel regions and supplying the integration result or the average result stored therein to the first and second dispersion calculators.

A digital camera is generally provided with a block memory for realizing functions such as exposure adjustment and auto white balance. In the foregoing constitutions, the block memory can be utilized so that the phase adjustment can be controlled in a more detailed manner.

The phase adjustment device according to the present invention may be constituted such that the timing adjuster sets the phase of the pulse to be optimal for the first pixel region in the first pixel region, and sets a phase of the pulse which is shifted form the phase of the pulse in the first pixel region in the second pixel region. According to this constitution, the phase of the pulse to be phase-adjusted is variously set, and then, the variation of the luminance levels and the like can be checked. As a result, the degree and the direction of the phase adjustment can be determined.

The phase adjustment device according to the present invention may be constituted such that the adjustment judger judges a direction in which the phase of the analog imaging signal is shifted and an amount of the phase shift based on a comparison result by the data comparator obtained in a state where the phase of the pulse is set to be optimal for the first pixel region in the first pixel region and the optimum phase of the pulse in the first pixel region is shifted chronologically forward in the second pixel region and a comparison result by the data comparator obtained in a state where the phase of the pulse is set to be optimal for the first pixel region in the first pixel region and the optimum phase of the pulse in the first pixel region is shifted chronologically backward in the second pixel region. According to this constitution, the direction which is suitable for the phase adjustment can be easily determined.

The phase adjustment device according to the present invention may be constituted such that the timing adjuster calculates the optimal phase of the pulse when the adjustment judger judges the phase adjustment to be necessary, and indicates the calculated optimal phase to the timing generator which generates the pulse.

The phase adjustment device according to the present invention may be constituted such that the pulse is a peak sample pulse for detecting a signal level of the analog imaging signal. The phase adjustment device according to the present invention may be constituted such that the pulse is a reference sample pulse for detecting a signal level which is used as a reference when the analog imaging signal is subjected to the correlated double sampling.

The phase adjustment device according to the present invention may be constituted such that the timing adjuster makes fine adjustments to the phase of the pulse in the second region every time an image is obtained after the phase of the pulse is fixed in the first pixel region. According to the constitution, the phase in the first pixel region is fixed at an optimal level, while a fine-adjustment shift is made to the phase of the pulse in the second pixel region.

The phase adjustment device according to the present invention may be constituted such that the pulse is a peak sample pulse for detecting a peak level of the analog imaging signal, a reference sample pulse for detecting a signal level used as a reference when the analog signal is subjected to the correlated double sampling, and an AD clock signal used when the analog imaging signal is AD-converted, and the timing adjuster repeatedly adjusts phases of the peak sample pulse, the reference sample pulse and the AD clock signal.

The phase adjustment device according to the present invention may be constituted such that the timing adjuster alternately repeats for each frame an adjustment manner in which the phase of the pulse is set to be optimal for the first pixel region in the first pixel region and the optimum phase of the pulse in the first pixel region is shifted chronologically forward in the second region and an adjustment manner in which the phase of the pulse is set to be optimal for the first pixel region in the first pixel region and the optimum phase of the pulse in the first pixel region is shifted chronologically backward in the second region. According to this constitution, the phase adjustment including the forward detection and the backward detection can be more accurately performed.

The phase adjustment device according to the present invention may be constituted such that the timing adjuster resets the phase of the pulse in accordance with a distribution of the luminance levels or a histogram distribution The phase adjustment device according to the present invention may be constituted such that, when the luminance level in the first pixel region and the luminance level in the second pixel region are different to each other by at least a first predetermined amount, the timing adjuster shifts the phase of the pulse by a second predetermined amount in a direction in which the luminance levels become equal to each other. In the foregoing constitution, the predetermined amounts are preferably set in relation to at least one of colors of the analog imaging signal. The pixels for which the first and second predetermined amounts are set may be any of R pixel, Gr pixel, B pixel, and Gb pixel. Further, it is preferable that the pulse be more than one, and the first and second predetermined amounts be different for each of the pulses.

The phase adjustment device according to the present invention may be constituted such that the time adjuster does not perform phase adjustment in which a phase goes away from the initial optimal phase of the pulse by a predetermined amount or more. Further, it is preferable that the pulse be more than one, and the predetermined amount be different for each of the pulses. Thus constituted, the phase adjustment is limitedly performed within the appropriate adjustment target range. As a result, the phase adjustment can be more accurate and more efficient.

The phase adjustment device according to the present invention may be constituted such that the timing adjuster does not perform the phase adjustment in a state where the luminance levels are beyond a predetermined range. According to this constitution, the phase adjustment is limitedly performed within the appropriate adjustment target range. As a result, the phase adjustment can be more accurate and more efficient.

The phase adjustment device according to the present invention may further comprise a timing generator, wherein the timing generator generates first and second reference sample pulses used as references when the analog imaging signal is subjected to the correlated double sampling, first and second peak sample pulses for detecting a signal level of the analog imaging signal and first and second AD clock signals used when the analog imaging signal is AD-converted, in the first and second pixel regions, respectively.

A digital camera according to the present invention comprises any of the phase adjustment devices thus described, the imaging element, and a lens for collecting light on the imaging element.

According to the phase adjustment device of the present invention thus far described, the phases of the respective pulses outputted from the timing generator to be used for obtaining the image (reference sample pulse, peak sample pulse, AD clock signal and the like) can be automatically adjusted, and the phase adjustment device can respond to a case, with a high-speed operation, where the phase optimal for conditions in an actual use is changed due to environmental changes such as temperature change. Therefore, the phase adjustment can be performed in real time while the moving image is being obtained in the imaging operation so as to cope with a speed of driving pulses which becomes faster as the number of pixels increases.

The phase adjustment device according to the present invention is useful for automatically adjusting a timing of a pulse used for obtaining an image in a digital camera provided with upgraded pixels for which a high-speed operation is demanded.

BRIEF DESCRIPTION OF THE DRAWINGS

These and other objects as well as advantages of the invention will become clear by the following description of preferred embodiments of the invention and be specified the claims attached hereto. A number of benefits not recited in this specification will come to the attention of the skilled in the art upon the implementation of the present invention.

DETAILED DESCRIPTION OF THE INVENTION

Figure 1:
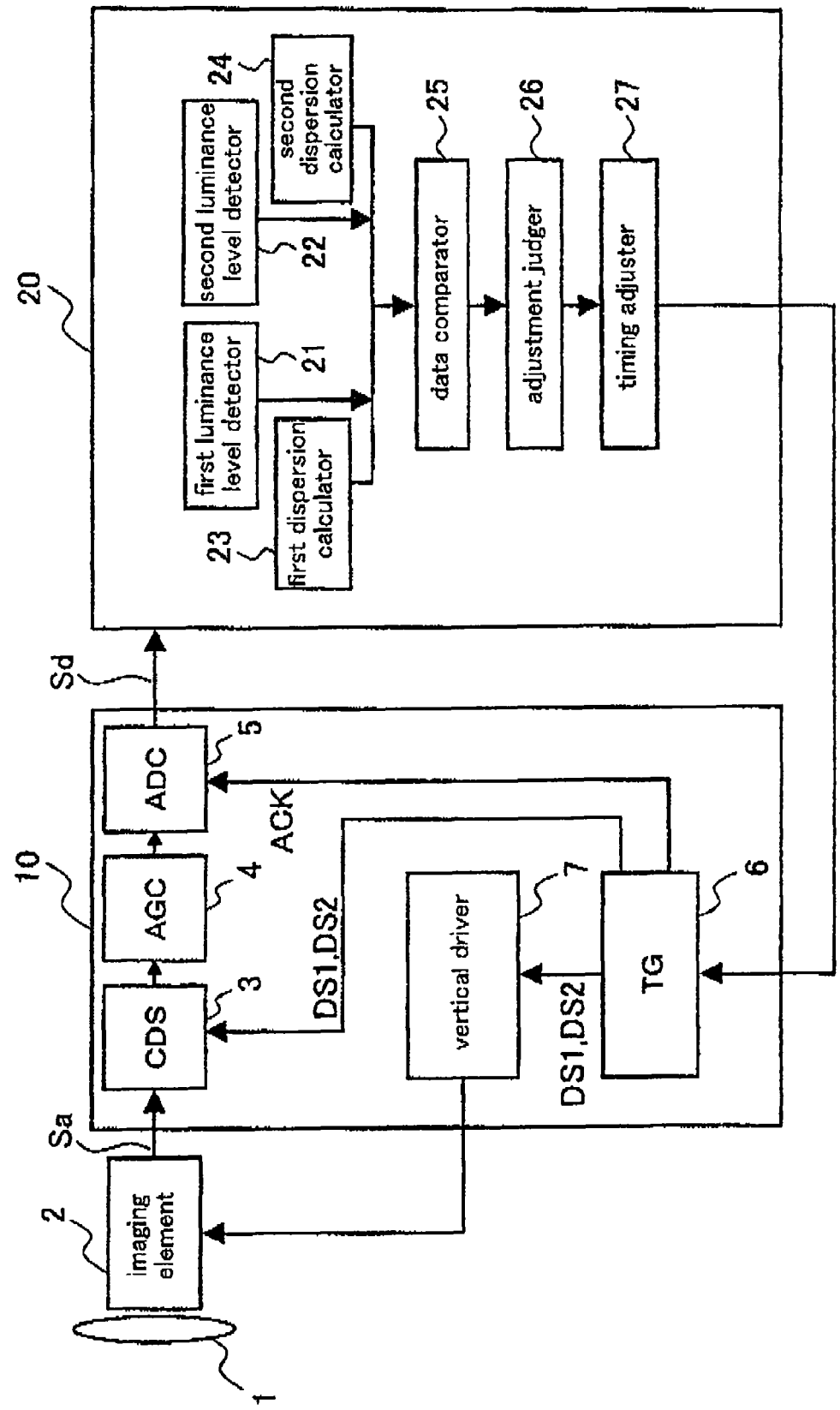
FIG. 1 is a block diagram illustrating an overall constitution of a digital camera according to a preferred embodiment 1 of the present invention.

Hereinafter, preferred embodiments of the present invention are described referring to the drawings.

Preferred Embodiment 1

FIG. 1 is a block diagram illustrating an overall constitution of a digital camera according to a preferred embodiment 1 of the present invention. The digital camera according to the present preferred embodiment comprises an optical lens 1 for collecting light of a photographic subject on an imaging element, an imaging element 2 for obtaining an image of the photographic subject whose light is collected by the optical lens 1 (CCD is given as an example in the description below), an analog front end 10 providing predetermined processes to an imaging signal Sa (image data) outputted from the imaging element 2 and converting the processed signal into a digital imaging signal Sd, and a DSP (Digital Signal Processor) 20 for generating a video signal after providing predetermined processes (color correction, YC processing and the like) to the digital imaging signal Sd outputted from the analog front end 10.

The analog front end 20 comprises a correlated double sampling unit 3 for executing the correlated double sampling in order to determine a signal level of the analog imaging signal Sa outputted from the imaging element 2, an AGC (Automatic Gain Controller) 4 for amplifying a signal outputted from the correlated double sampling unit 3 by an adjustable gain, an AD (Analog Digital) converter 5 for converting the signal amplified by the AGC 4 into the digital imaging signal Sd, a timing generator 6 for generating a pulse used for obtaining an image, and a vertical driver 7 for outputting the pulse generated by the timing generator 6 to the imaging element 2.

A first pixel region A and a second pixel region B are set in an entire screen of one field. For example, the first pixel region A is an arbitrary line within an image, and the second pixel region B is a line adjacent to that of the first pixel region A. When the respective regions are thus set, image data obtained from the first pixel region A and image data obtained from the second pixel region B, such as a luminance level, should be substantially equal to each other. Therefore, it can be judged if there is any shift in the phase by detecting a difference between the image data of the two pixel regions. The second pixel region B does not need to be the line adjacent to that of first pixel region A as far as the image data which is substantially the same as that of the first pixel region A can be obtained from the second pixel region.

The DSP 20 comprises a first luminance level detector 21 for detecting the luminance level by calculating a signal level average value in a plurality of pixels in the first pixel region A, a second luminance level detector 22 for detecting the luminance level by calculating a signal level average value in a plurality of pixels in the second pixel region B, a first dispersion calculator 23 for calculating dispersion of the signal level of each pixel in the first pixel region A, a second dispersion calculator 24 for calculating dispersion of the signal level of each pixel in the second pixel region B, a data comparator 25 for comparing detection results obtained by the first and second luminance level detector 21 and 22 and comparing calculation results obtained by the first and second dispersion calculators 23 and 24, an adjustment judger 26 for judging if the phase is shifted based on comparison results obtained by the data comparator 25 and judging whether or not the phase shift is within an adjustment target range, and a timing adjuster 27 for adjusting phases (timings) of a reference sample pulse DS1, a peak sample pulse DS2 and an AD clock signal ACK generated by the timing generator 6 when the shift of the phase is judged to be within the adjustment target range by the adjustment judger 26. The timing generator 6 supplies the reference sample pulse DS1 and the peak sample pulse DS2 to the correlated double sampling unit 3 and the vertical driver 7, and supplies the AD clock signal ACK to the AD converter 5.

Figure 2:
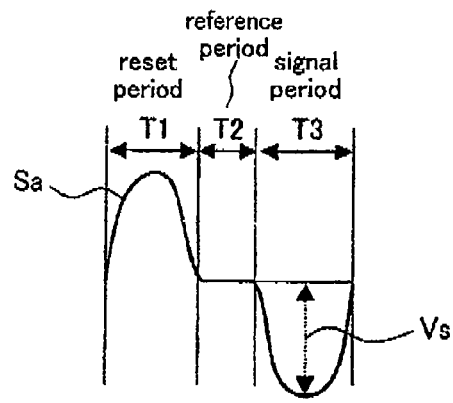
FIG. 2 is a drawing in which a signal component outputted from an imaging element is chronologically illustrated.

FIG. 2 is a drawing in which the signal component outputted from the imaging element 2 is chronologically illustrated. As shown in FIG. 2, a reset period T1, a reference period T2 and a signal period T3 constitute the analog imaging signal Sa. The reset period T1 is a period during which the imaging element 2 is reset. The reference period T2 is a period during which a reference voltage is outputted from the imaging element 2, and a period during which a signal which is used as a reference when the correlated double sampling unit 3 is operated is detected. The signal period T3 is a period during which a signal voltage is outputted, wherein a signal voltage which peaks in the signal period T3 and the reference voltage in the reference period T2 are sampled to obtain a difference there between, so that a signal level Vs of the analog imaging signal Sa can be obtained. In FIG. 2, a downward direction shown therein is defined as a positive direction of the signal component.

Next, operations of the phase adjustment device according to the present preferred embodiment thus constituted are described. The data comparator 25 compares the luminance level in the first pixel region obtained by the first luminance level detector 21 and the luminance level in the second pixel region obtained by the second luminance level detector 22, and determines that the phase is shifted when a difference between the two luminance levels is at least a certain level. Further, the data comparator 25 compares the dispersion in the first pixel region obtained by the first dispersion calculator 23 and the dispersion in the second pixel region obtained by the second dispersion calculator 24, and determines that the phase is shifted when a difference between the two dispersions is at least a certain level. When the phase shift is detected by the data comparator 25 and it is determined by the adjustment judger 26 that the phase shift is within the adjustment target range, the timing adjuster 27 adjusts the phases of the reference sample pulse DS1, peak sample pulse DS2 and AD clock signal.

Figure 3:
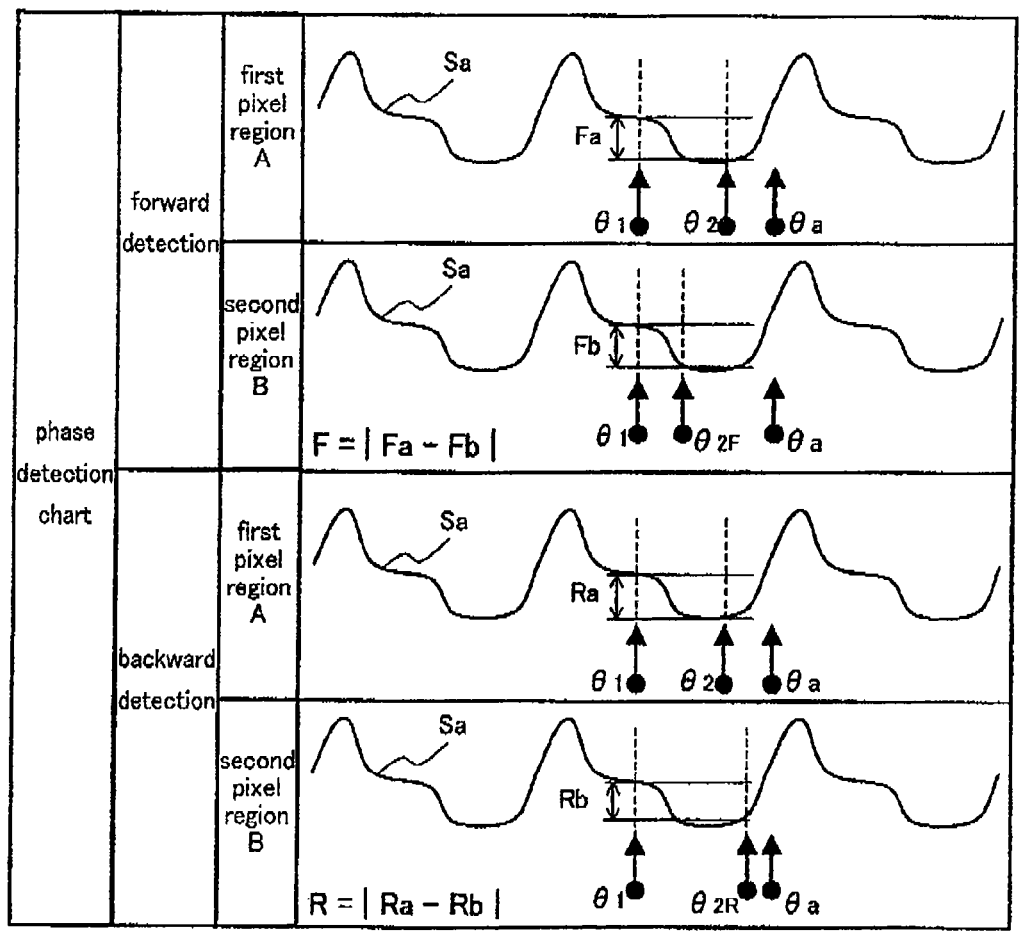
FIG. 3 is an illustration of a phase shift judging method according to the preferred embodiment 1 (before a phase shift is generated).
Figure 4:
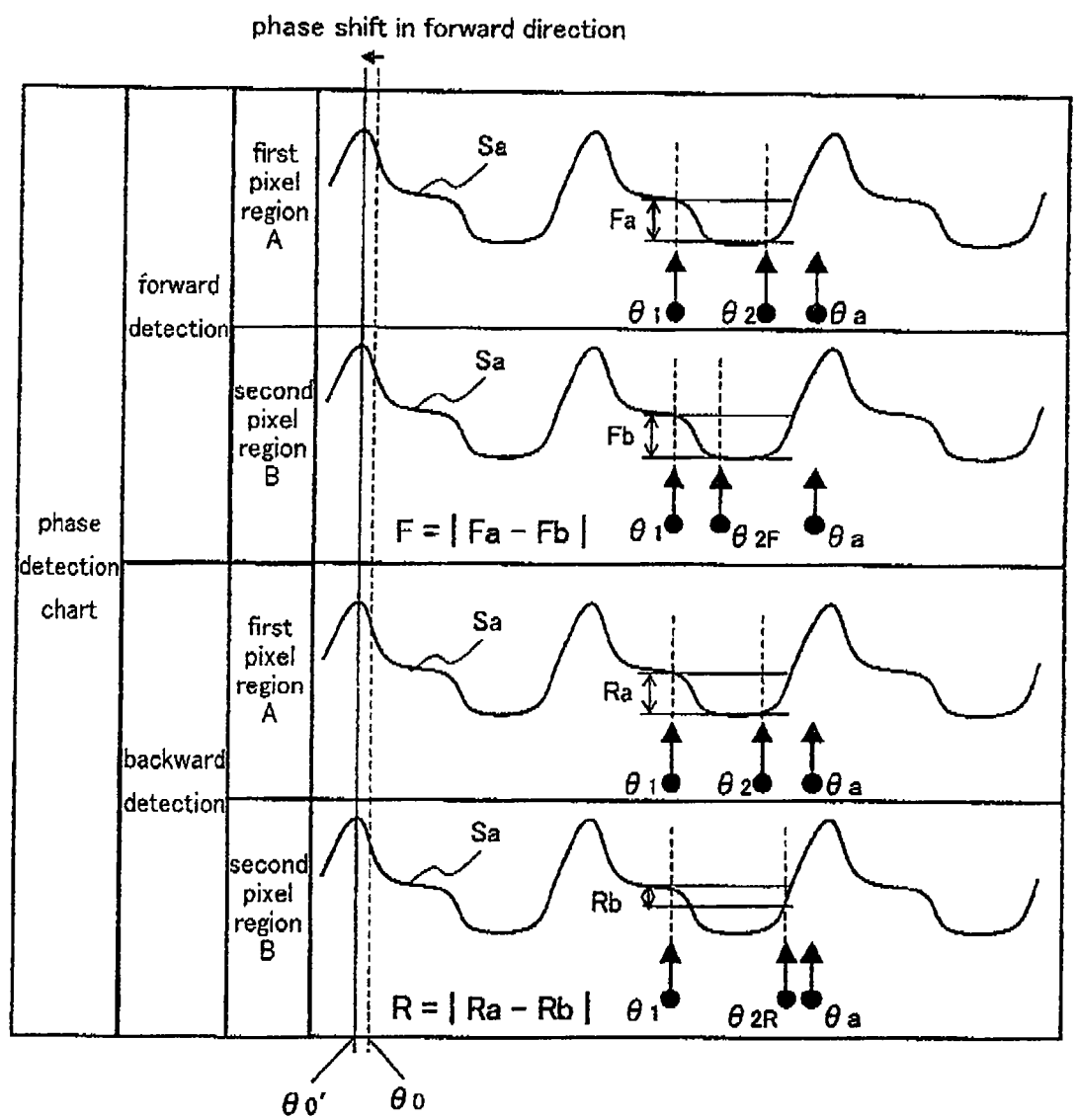
FIG. 4 is an illustration of a phase shift judging method according to the preferred embodiment 1 (after the phase shift is generated).

Referring to FIGS. 3 and 4, forward detection and backward detection are described. The forward detection is a detection manner wherein a phase of the pulse to be phase-adjusted is shifted chronologically forward, and then, the phase shift is detected. The backward detection is a detection manner wherein the phase of a pulse to be phase-adjusted is shifted chronologically backward, and then, the phase shift is detected. The description given below is based on an example in which a pulse to be phase-adjusted is only the peak sample pulse DS2. In the description, chronologically forward and backward are simply referred to as forward and backward.

As shown in FIG. 3, the phases of the reference sample pulse DS1 peak sample pulse DS2 and AD clock signal ACK are set to optimal phases ($\theta_1$, $\theta_2$, and $\theta_a$) in the first pixel region A in both of the forward detection and backward detection. In FIG. 3, it is assumed that the phase of the analog imaging signal Sa is in an optimal state.

In the forward detection, the phase of the peak sample pulse DS2 is set to a phase $\theta_{2F}$, which is slightly shifted forward in the second pixel region B. Because the phase is slightly shifted, a luminance level difference F=|Fa−Fb|, which is a difference between a luminance level Fa in the first pixel region A and a luminance level Fb in the second pixel region B, is very small. In the backward detection, the phase of the peak sample pulse DS2 is set to a phase $\theta_{2R}$, which is slightly shifted backward in the second pixel region B. Because the phase is slightly shifted, a luminance level difference R=|Ra−Rb|, which is a difference between a luminance level Ra in the first pixel region A and a luminance level Rb in the second pixel region B, is very small.

It is assumed that, as shown in FIG. 4, the phase of the analog imaging signal Sa is shifted from a position on a dotted line $\theta_o$ to a position on a solid line $\theta_{o'}$ under the influence of some disturbance such as temperature change. The phase shift of the analog imaging signal Sa due to the disturbance is in a forward direction. At the time, in the first pixel region A, the phase $\theta_2$ of the peak sample pulse DS2 is not largely shifted with respect to a peak value of the analog imaging signal Sa.

In the case of the forward detection, the timing adjuster 27 shifts the phase of the peak sample pulse DS2 forward from $\theta_2$ to $\theta_{2F}$ in the second pixel region B. Despite the shift, the luminance level Fb still hardly shows any change in comparison to the state shown in FIG. 3. The luminance level difference F (=|Fa−Fb|), which is the difference between the luminance level Fa in the first pixel region A and the luminance level Fb in the second pixel region B, is very small in a manner similar to FIG. 3. The reason is described below. In the forward detection, the pulse is shifted forward ($\theta_2 \rightarrow \theta_{2F}$) for a check as described earlier. The shift direction is thus forward and is the same as the phase shift direction (forward: $\theta_0 \rightarrow \theta_{0'}$) of the analog imaging signal Sa due to the disturbance. As a result, an influence caused by the forward shift of the pulse is balanced out, and the luminance level difference F (=|Fa−Fb|) is thereby very small.

In the case of the backward detection, the timing adjuster 27 shifts the phase of the peak sample pulse DS2 backward from $\theta_2$ to $\theta_{2R}$ in the second pixel region B. Then, the luminance level Rb largely decreases in comparison to the state shown in FIG. 3. Consequently, the luminance level difference R (=|Ra−Rb|), which is the difference between the luminance level Ra in the first pixel region A and the luminance level Rb in the second pixel region B, increases. The reason is described below. In the backward detection, the pulse is shifted backward ($\theta_2 \rightarrow \theta_{2R}$) for a check as described earlier. The shift direction therein is thus backward and is opposite to the phase shift direction (forward; $\theta_0 \rightarrow \theta_{0'}$) of the analog imaging signal Sa due to the disturbance. As a result, an influence caused by the backward shift of the pulse becomes evident, and the luminance level difference R (=|Ra−Rb|) is thereby increased.

In the case described above, the difference is not shown in the forward detection, while the different is shown in the backward detection, which leads to the judgment that the phase of the analog imaging signal is shifted forward. In the case of the analog imaging signal Sa whose phase is shifted forward, not only the phase of the peak sample pulse DS2 but also the phases of the reference sample pulse DS1 and the AD clock signal ACK can also be judged to be similarly shifted forward. In order to correct the forward phase shift of the analog imaging signal Sa, the phases of the reference sample pulse DS1, peak sample pulse DS2 and AD clock signal ACK are shifted forward by a predetermined amount (m pulses).

On the contrary to the foregoing description, in the case where the difference is not shown in the backward detection but shown in the forward detection, the phase of the analog imaging signal Sa is judged to have been shifted backward. In order to correct the backward phase shift of the analog imaging signal Sa, the phases of the reference sample pulse DS1, peak sample pulse DS2 and AD clock signal ACK are shifted backward by the predetermined amount (m pulses).

The Summary of the description is shown below.

Case (a)
(forward detection: small change in luminance level difference) and (backward detection: large change in luminance level difference)
↓
The forward-shift phase adjustment is selected.

Case (b)
(forward detection: large change in luminance level difference) and (backward detection: small change in luminance level difference)
↓
The backward-shift phase adjustment is selected.

In the case where a large change is detected in the luminance level difference in both of the forward detection and backward detection, a possible reason for that is a too large shift of the phase of the peak sample pulse DS2 from the optimal phase in the second pixel region B. In brief, the differences, $|\theta_2 \rightarrow \theta_{2F}|$ and $|\theta_2 \rightarrow \theta_{2R}|$, are judged to be too large, in which case, the judgment that a phase is shifted is not made, and the phase adjustment is not performed. The same predetermined amount (m pulses) for phase adjustment may be used for each of the reference sample pulse DS1, peak sample pulse DS2 and AD clock signal ACK, or a different predetermined amount (m pulses) may be used for each.

Figure 5:
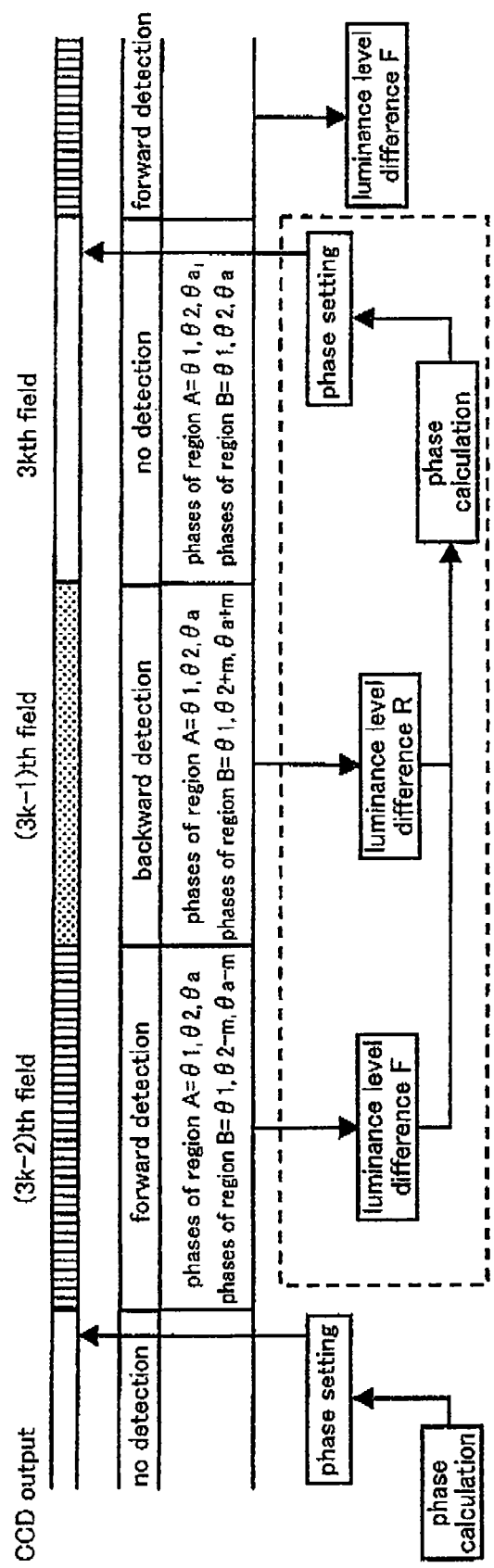
FIG. 5 is a timing chart illustrating forward detection and processing executed every time an image is obtained.

FIG. 5 shows patterns of the forward detection, backward detection and phase setting described above. In the description below, k is an arbitrary natural number.

As is learnt from FIG. 5,
the forward detection is performed in (3k−2)th field.
the backward detection is performed in (3k−1)th field.
the phase is calculated and set in 3kth field.

As described above, the phases of the sample pulse DS1, peak sample pulse DS2 and AD clock signal ACK are adjusted while the phase shift detection and the phase setting are repeatedly performed for every three fields. As result, the phase of the analog imaging signal Sa, which is shifted from the optimal phase due to such a disturbance as temperature change, can be reset to the optimal phase.

Figure 6:
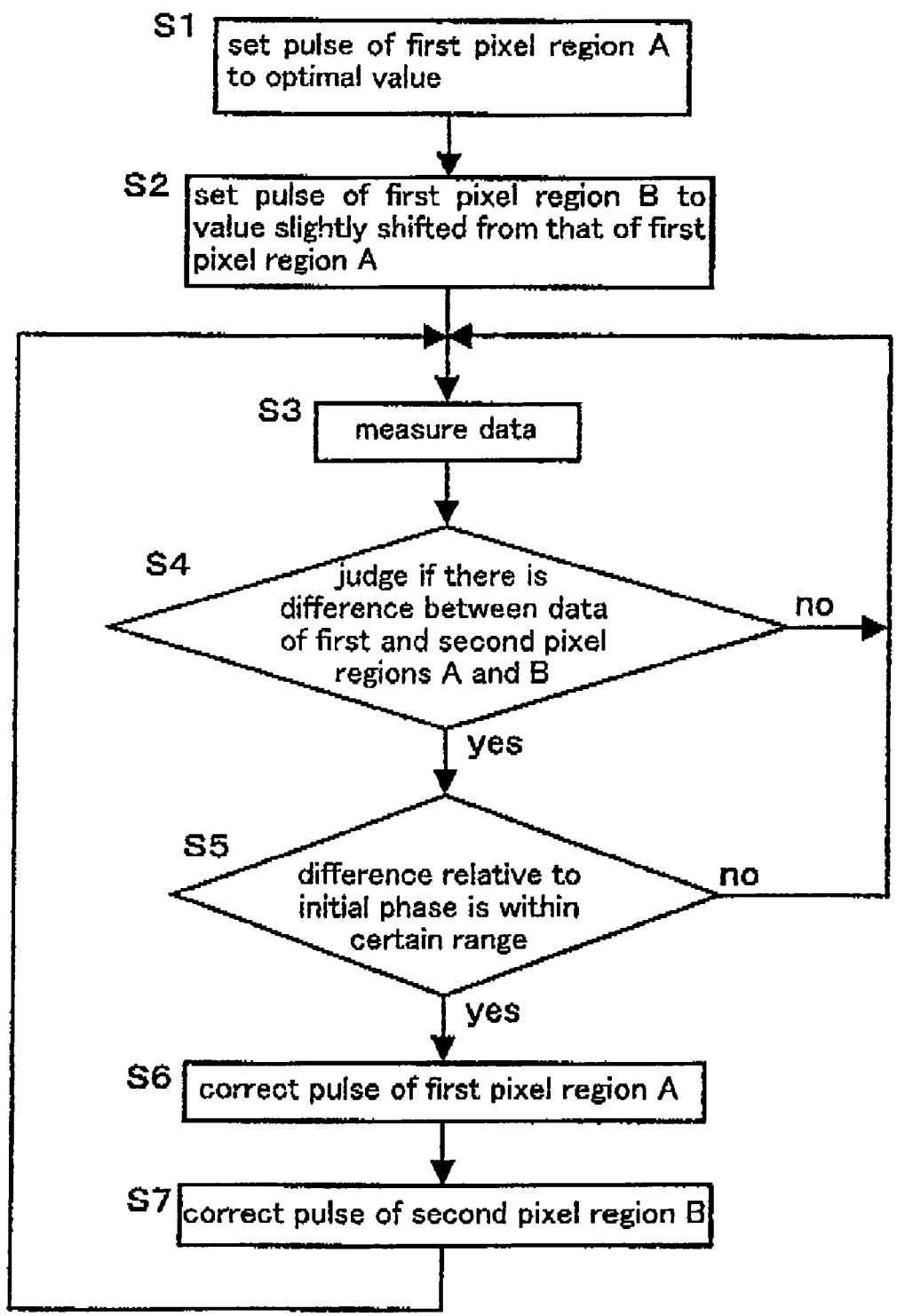
FIG. 6 is a flow chart illustrating an overall operation of a phase adjustment performed for respective pulses according to the preferred embodiment 1.

Below is described the operation of the phase adjustment device according to the present preferred embodiment referring to a flow chart. FIG. 6 is a flow chart illustrating an overall operation of the phase adjustment for the respective pulses according to the present preferred embodiment. The phase adjustment in the description is performed mainly by the first luminance level detector 21, second luminance level detector 22, first dispersion calculator 23, second dispersion calculator 24, data comparator 25, adjustment judger 26 and timing adjuster 27. The pulses to be phase-adjusted are the reference sample pulse DS1, peak sample pulse DS2 and AD clock signal ACK.

In Step S1, the phases of the pulses in the first pixel region A are optimally set. In Step S2, the phases of the pulses in the second pixel region B are set to values which are slightly shifted from the optimal values. The time when Steps S1 and S2 are implemented is a time when initial phases of the respective pulses are adequately adjusted to the optimum values before the device is shipped from a factory or a time when initial adjustment is made by a user after the shipment.

In Step S3, pixel data is measured. More specifically, an image is fetched, and the luminance level and dispersion values in the first and second pixel regions A and B are detected. In Step S4, it is judged whether or not a difference between the pixel data value in the first pixel region A (luminance level and dispersion values) and the pixel data value (luminance level and dispersion values) in the second pixel region B is at least a predetermined threshold value. The judgment is made in both of the forward detection and backward detection manners. When the difference between the pixel data values is judged to be below the predetermined threshold value in the Step S4, the data measurement is performed again in the Step S3 for the next pulse. When the difference between the pixel data values is judged to be at least the predetermined threshold value in the Step S4, it is judged in Step S5 whether or not a difference between the phase of the pulse in the second pixel region B which was shifted in the Step S2 and the initial phase is within a certain range. In other words, it is judged whether or not the phase of the pulse in the second pixel region B which was shifted in the Step S2 was excessively shifted. When it is determined in the Step S5 that the phase shift is excessive, the data measurement is performed again in the Step S3 for the next pulse. When it is determined in the Step S5 that the phase shift is not excessive, the phase of the pulse in the first pixel region A is corrected in Step S6, and the phase of the pulse in the second pixel region B is corrected in Step S7. When the Step S7 is completed, the operation returns to the Step S3.

In the operations described above, the forward detection and the backward detection are alternately performed, and it is checked in which direction the phase was shifted, and then, the phase shift is corrected. In such a manner, the phase adjustment is performed. In the foregoing description, the luminance and dispersion levels of R pixel, Gr pixel, B pixel, and Gb pixel are used for the detection; however, all types of pixel data may be used, or only one of the pixel data may be used. When the luminance level difference or the dispersion difference between the first and second pixel regions A and B exceeds a threshold value for judging the luminance level difference or a threshold value for judging the dispersion difference set for each of the pixels (R pixel, Gr pixel, B pixel, and Gb pixel), the phase is judged to have been shifted.

Figure 7:
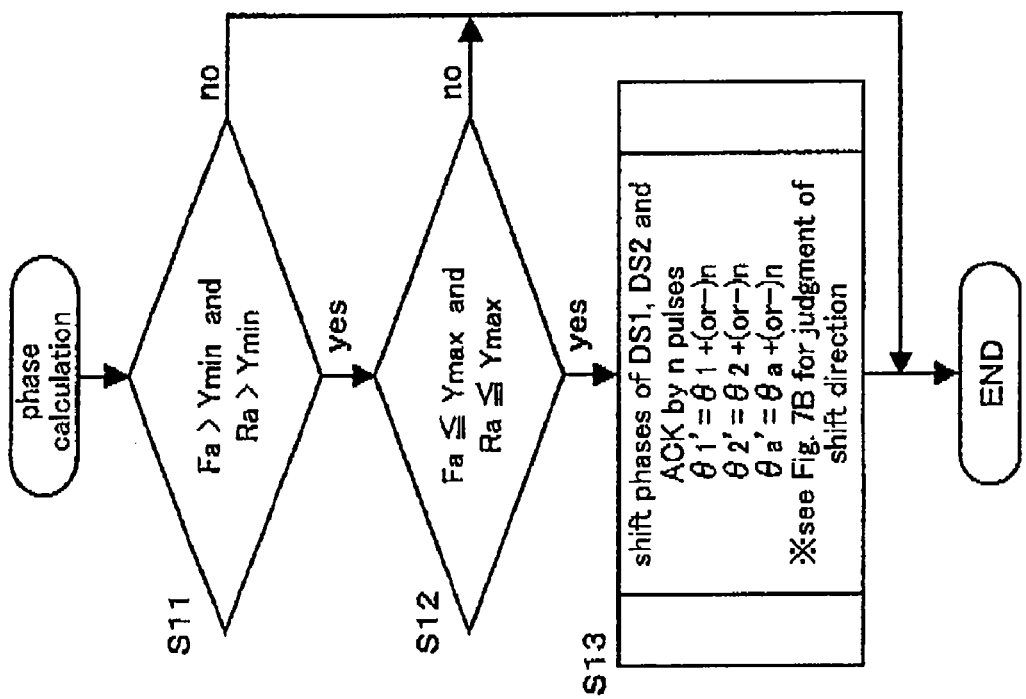
FIG. 7A is a flow chart of the phase adjustment in the case where a luminance level is used according to the preferred embodiment 1.
FIG. 7B is a condition table used in a phase changing method according to the preferred embodiment 1.

FIG. 7A is a flow chart illustrating more detailed operations of the phase adjustment in the phase adjustment device according to the present preferred embodiment. FIG. 7B is a condition table in a phase changing method. It is judged in Step S11 whether or not the luminance level Fa in the first pixel region A in the forward detection is larger than a phase-adjustable luminance level lower-limit value Ymin and the luminance level Ra in the first pixel region A in the backward detection is larger than the phase-adjustable luminance level lower-limit value Ymin, (Fa>Ymin and Ra>Ymin). When the judgment in the Step S11 shows YES, the operation advances to Step S12. When the judgment in the Step S11 shows NO, the operation is terminated. More specifically, when it is judged that the luminance level Fa in the forward detection or the luminance level Ra in the backward detection is equal to or below the phase-adjustable luminance level lower-limit value Ymin, (Fa≦Ymin and Ra≦ymin), there hardly appears any difference between the luminance level in the first pixel regions A and the luminance level in the second pixel region B. Therefore, the phase adjustment is not performed.

It is judged in the Step S12 whether or not the luminance level Fa in the first pixel region A in the forward detection is equal to or below a phase-adjustable luminance level upper-limit value Ymax and the luminance level Ra in the first pixel region A in the backward detection is equal to or below the phase-adjustable luminance level upper-limit value Ymax, (Fa≦Ymax and Ra≦max). When the judgment in the Step S12 shows YES, the operation advances to Step S13. When the judgment in the Step S12 shows NO, the operation is terminated. More specifically, when it is judged that the luminance level Fa in the forward detection or the luminance level Ra in the backward detection is at least the phase-adjustable luminance level upper-limit value Ymax, the saturation of the luminance level is highly probable. Therefore, the phase adjustment is not performed. Accordingly, the phase adjustment is selectively performed only in the case where the luminance level is within the predetermined range.

In the Step S13, the phase of the pulse to be phase-adjusted is shifted to the plus side (forward side) by n pulses, so that the luminance level difference F in the forward detection is calculated, and the phase of the pulse to be phase-adjusted is also shifted to the minus side (backward side) by n pulses, so that the luminance level difference R in the backward detection is calculated. Then, the combination of these luminance level differences (F, R) is checked against the phase change condition table shown in FIG. 7B (judged if the combination (F, R) satisfies any of conditions #1-#4). Accordingly, the phase change direction is decided, and the phases of the pulses DS1, DS2 and ACK are shift-adjusted along the decided phase change direction.

In FIG. 7B, when Fa denotes the luminance level in the first pixel region A in the forward detection, and Fb denotes the luminance level in the second pixel region B in the forward detection, the luminance level difference F in the forward detection is F=|Fa−Fb|. Further, when Ra denotes the luminance level in the first pixel region A in the backward detection, and Rb denotes the luminance level in the second pixel region B in the backward detection, the luminance level difference R in the backward detection is R=|Ra−Rb|.

Further, in FIG. 7B, the condition #1 applies to a case where the luminance level difference F in the forward detection is larger than a judgment threshold value Th, and the luminance level difference R in the backward detection is larger than the judgment threshold value Th. In this case, it is determined that the phase shift is beyond the adjustment target range, and the n-pulse shift for the phase adjustment is not performed. The n-pulse shift denotes a minute amount of change in the phase adjustment.

The condition #2 applies to a case where the luminance level difference F in the forward detection is at most the judgment threshold value Th, and the luminance level difference R in the backward detection is at most the judgment threshold value Th. In this case, it is also determined that the phase shift is beyond the adjustment target range, and the n-pulse shift for the phase adjustment is not performed.

The condition #3 applies to a case where the luminance level difference R in the backward detection is larger than the judgment threshold value Th; however, the luminance level difference F in the forward detection is at most the judgment threshold value Th. In this case, it is determined that the phase shift is within the adjustment target range. In other words, this case is judged to fit into the case (a) (forward detection: small change in luminance level difference) and (backward detection: large change in luminance level difference). Upon the judgment, the phase is shifted to the plus side by n pulses for the phase adjustment, which means that the phase of the pulse is shifted forward.

The condition #4 applies to a case where the luminance level difference F in the forward detection is larger than the judgment threshold value Th; however, the luminance level difference R in the backward detection is at most the judgment threshold value Th. In this case, it is determined that the phase shift is within the adjustment target range. In other words, this case is judged to fit into the case (b) (forward detection: large change in luminance level difference) and (backward detection: small change in luminance level difference). Upon the judgment, the phase is shifted to the minus side by n pulses for the phase adjustment, which means that the phase of the pulse is shifted backward.

The Steps S11, S12 and S13 are independently and repeatedly executed for each of the reference sample pulse DS1 and the peak sample pulse DS2 by the first and second luminance level detectors 21 and 22. The Steps S1, s12 and S13 are also repeatedly executed for the AD clock signal ACK by the first and second dispersion calculators 23 and 24. Below is given a description.

First, the phases of the reference sample pulse DS1 and the AD clock signal ACK are fixed to predetermined initial values. Then, data necessary for determining the phase of the peak sample pulse DS2 is measured while the phase of the peak sample pulse DS2 is being shifted from the initial value. Then, the measured data is evaluated, and the phase which is optimal for the peak sample pulse DS2 is decided.

Once the optimal phase of the peak sample pulse DS2 is decided, the phase of the peak sample pulse DS2 is fixed to the decided optimal value. Further, data necessary for deciding the phase of the reference sample pulse DS1 is measured while the phase of the reference sample pulse DS1 is being shifted from the initial value with the phase of the AD clock signal ACK remaining fixed to the initial value. Then, the measured data is evaluated, and the phase which is optimal for the reference sample pulse DS1 is decided.

Once the optimal phases of the peak sample pulse DS2 and the reference sample pulse DS1 are decided, the phases of these pulses are fixed to the optimal phases. Then, data necessary for determining the phase of the AD clock signal ACK is measured while the phase of the AD clock signal ACK is being shifted from the initial value. Then, the measured data is evaluated, and the phase which is optimal for the AD clock signal ACK is decided.

Once the optimal phases of the peak sample pulse DS2, reference sample pulse DS1 and AD clock signal ACK are decided, information relating to the decided optimal phases is set in a register in the timing generator 6. As a result, the pulses having the optimal phases are generated.

Preferred Embodiment 2

Figure 8:
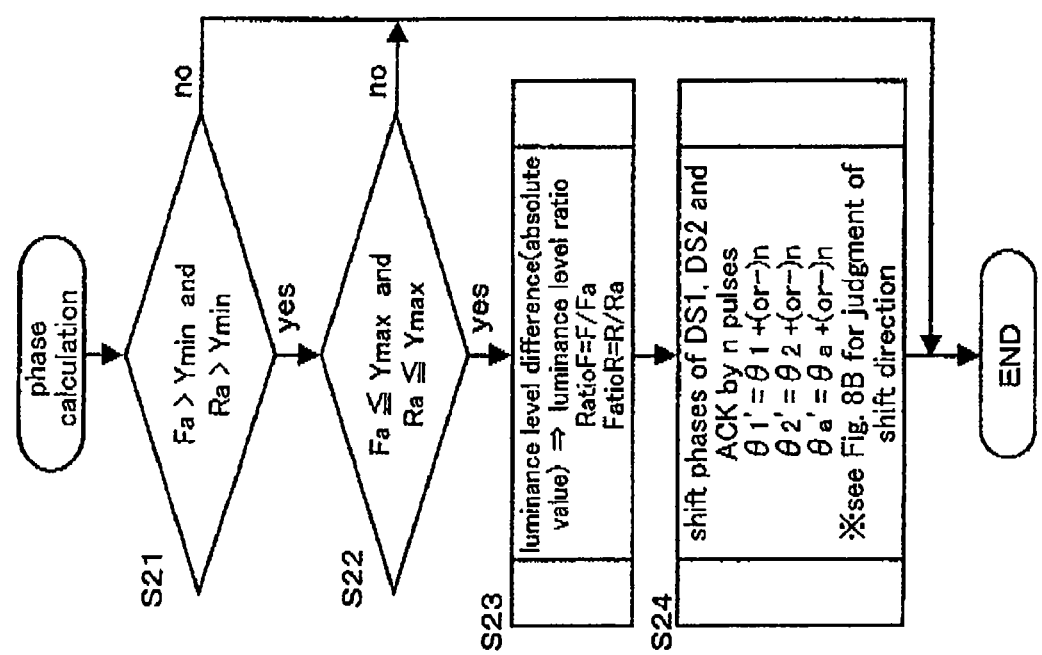
FIG. 8A is a flow chart of the phase adjustment in the case where a luminance level ratio is used according to a preferred embodiment 2 of the present invention.
FIG. 8B is a condition table used in a phase changing method according to the preferred embodiment 2.

FIG. 8A is a flow chart of phase adjustment operations in a phase adjustment device according to a preferred embodiment 2 of the present invention. FIG. 8B is a condition table used in a phase changing method. These drawings correspond to FIGS. 7A and 7B according to the preferred embodiment 1. In the preferred embodiment 1, the luminance level difference between the first and second pixel regions A and B itself is used for the detection of the phase shift. In the present preferred embodiment, a ratio of the foregoing luminance level difference relative to the luminance level in the first pixel region A is used. Below is given a description. Steps S21 and S22 according to the present preferred embodiment are the same as the Steps S11 and S12 according to the preferred embodiment 1 (FIG. 7A). Therefore, the description thereof is omitted.

In Step S23, luminance level ratios Ratio F in the forward detection and Ratio R in the backward detection are calculated. The luminance level ratio Ratio F in the forward detection and the luminance level ratio Ratio R in the backward detection are as follows:

Ratio $F=F/Fa=|Fa-Fb|/Fa$

Ratio $R=R/Ra=|Ra-Rb|/Ra$

Fa: luminance level in first pixel region A in forward detection
Fb: luminance level in second pixel region B in forward detection
Ra: luminance level in first pixel region A in backward detection
Rb: luminance level in second pixel region B in backward detection When the luminance level ratios Ratio F and Ratio R are thus calculated, it is known by what percentage the luminance level in the second pixel region B is different to the luminance level in the first pixel region A.

In Step S24, a result of comparison of the luminance level ratio Ratio F in the forward detection to a luminance level ratio judgment threshold value Rmax, and a result of comparison of the luminance level ratio Ratio R in the backward detection to the luminance level ratio judgment threshold value Rmax are checked against the phase change condition table shown in FIG. 8B (it is judged which of conditions #1-#4 the combination of the luminance level ratios (Ratio F, Ratio R) fits into). Accordingly, the phase change direction is decided, and the phases of the respective pulses DS1, DS2 and ACK are shift-adjusted along with the decided phase change direction.

In FIG. 8B, the condition #1 applies to a case where the luminance level ratio Ratio F in the forward detection is larger than the judgment threshold value Rmax, and the luminance level ratio Ratio R in the backward detection is larger than the judgment threshold value Rmax. In this case, it is determined that the phase shift is beyond the adjustment target range, and the n-pulse shift for the phase adjustment is not performed.

The condition #2 applies to a case where the luminance level ratio Ratio F in the forward detection is at most the judgment threshold value Rmax, and the luminance level ratio Ratio R in the backward detection is at most the judgment threshold value Rmax. In this case, it is also determined that the phase shift is beyond the adjustment target range, and the n-pulse shift for the phase adjustment is not performed.

The condition #3 applies to a case where the luminance level ratio Ratio R in the backward detection is larger than the judgment threshold value Rmax; however the luminance level ratio Ratio F in the forward detection is at most the judgment threshold value Rmax. In this case, it is determined that the phase shift is within the adjustment target range, and the phase is shifted to the plus side by n pulses for the phase adjustment. In other words, the phase of the pulse is shifted forward.

The condition #4 applies to a case where the luminance level ratio Ratio F in the forward detection is larger than the judgment threshold value Rmax; however the luminance level ratio Ratio R in the backward detection is at most the judgment threshold value Rmax. Then, it is determined that the phase shift is within the adjustment target range, and the phase is shifted to the minus side by n pulses for the phase adjustment. In other words, the phase of the pulse is shifted backward.

The phase adjustment device according to the present invention performs the phase adjustment every time the optimal phase is shifted due to the temperature change or the like so as to constantly maintain the phase at an optimal level. However, the shift amount due to the temperature change generally stays within a certain range, and any phase shift well beyond the range may possibly be attributable to a serious failure of a camera or the like. Therefore, in the case where the difference between the initial phase and an optimal phase to be set in at least one of the reference sample pulse DS1, peak sample pulse DS2 and AD clock signal ACK exceeds the phase-adjustable amount set in each of the pulses, the phase adjustment is not carried out.

Preferred Embodiment 3

In the preferred embodiments 1 and 2, the phase shift is detected based on the luminance level difference. In a preferred embodiment 3 of the present invention, not the luminance level but the dispersion of the luminance level is used. More specifically, in the forward detection, a difference between the dispersion in the first pixel region A obtained by the first dispersion calculator 23 and the dispersion in the second pixel region B obtained by the second dispersion calculator 24 is calculated. Further, a difference between the dispersion in the first pixel region A and the dispersion in the second pixel region B is similarly calculated in the backward detection as well. A result of the comparison of the dispersion difference in the forward detection to a dispersion difference threshold value and a result of the comparison of the dispersion difference in the backward detection to the dispersion difference threshold value are checked against a condition table in a phase changing method (not shown). Then, the phase changing direction is decided, and the phases of the respective pulses DS1, DS2 and ACK are shift-adjusted along the decided phase changing direction. In this constitution, a ratio of the dispersion difference relative to the dispersion in the first pixel region A may be used in a manner similar to the case where the luminance level is used.

Preferred Embodiment 4

Figure 9:
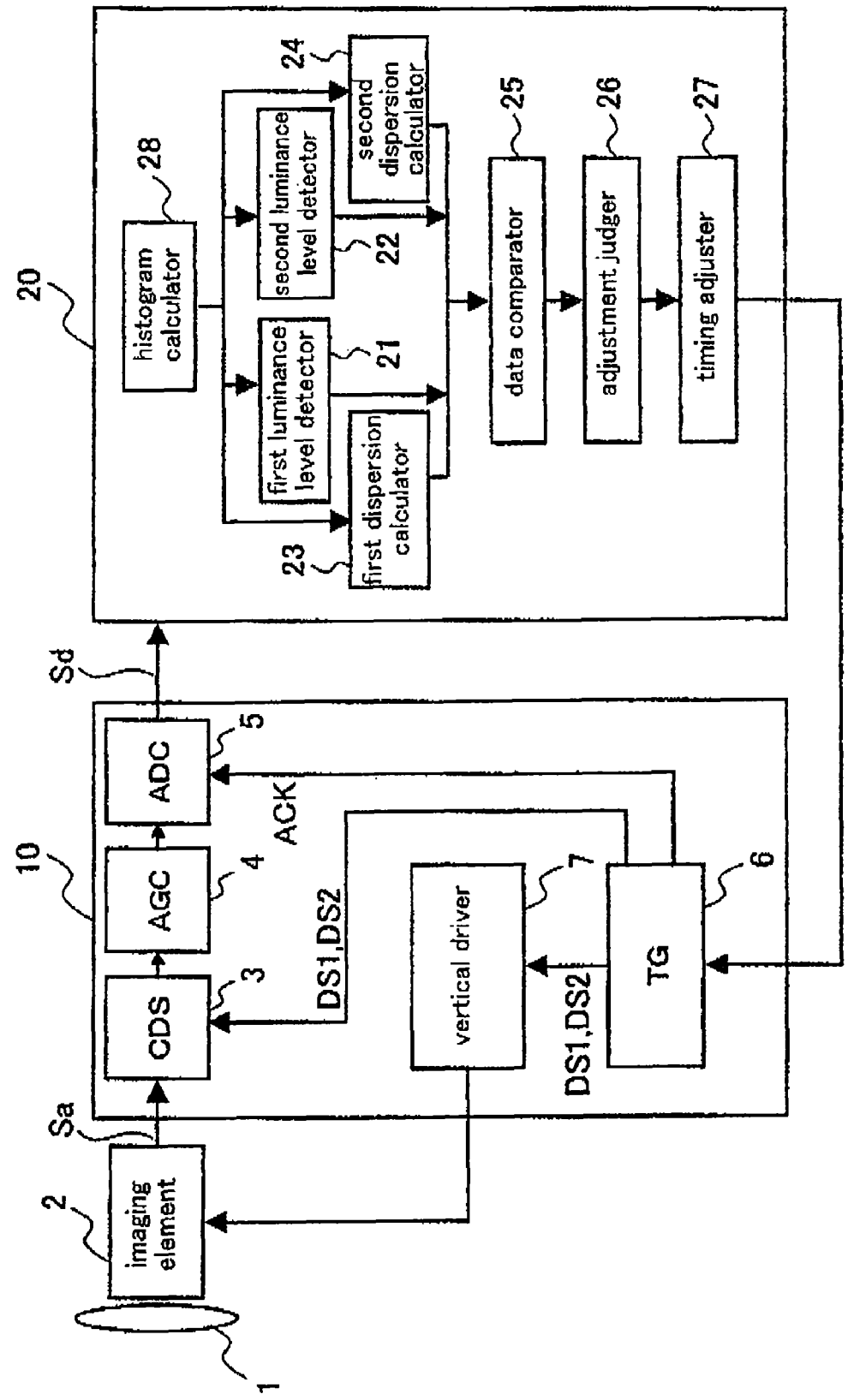
FIG. 9 is a block diagram illustrating an overall constitution of a digital camera according to a preferred embodiment 3 of the present invention.

FIG. 9 illustrates a constitution of a phase adjustment device according to a preferred embodiment 4 of the present invention. The phase adjustment device according to the present preferred embodiment performs the phase adjustment based on histogram. Therefore, the phase adjustment device according to the present preferred embodiment comprises a histogram calculator 28. The rest of the constitution is the same as that of the preferred embodiment 1 (FIG. 1), and the description thereof is omitted. It is assumed that signals inputted to the histogram calculator 28 are signals of R pixel, Gr pixel, B pixel, and Gb pixel outputted from the imaging element 2. It is also assumed the histogram calculator 28 is configured to be able to designate a pixel region to be used in the calculation, a range of the input signals used for which the histogram is to be calculated, and the number of division with which the range is divided into a predetermined number of sections. Further, the histogram calculator 28 can select a signal for which the histogram is to be calculated, and can switch to another signal.

The histogram calculator 28 counts the number of times of an appearance of each color signal (R, Gr, B, Bb) appears in each of the sections in each signal, and outputs the counted number of times of the appearance in each section when the calculation for all of the signals in the designated pixel region is completed. The first and second luminance level detectors 21 and 22 and the first and second dispersion calculators 23 and 24 are cooperatively operated, and these level detectors 21 and 22 and calculators 23 and 24 respectively calculate the luminance level and the dispersion based on the range of the signals and the counted number of times of the appearance.

A currently available digital still camera is provided with a function of displaying an image histogram after the image is processed. In the case where the functional block is utilized as the histogram calculator 28, it is unnecessary to separately provide the histogram calculator. An input signal in the case where the functional block is utilized is not a signal outputted from the imaging element 2, but a signal subjected to image processing. Therefore, it is necessary to change respective parameters for the image processing to values suitable for automatic adjustment.

Preferred Embodiment 5

Figure 10:
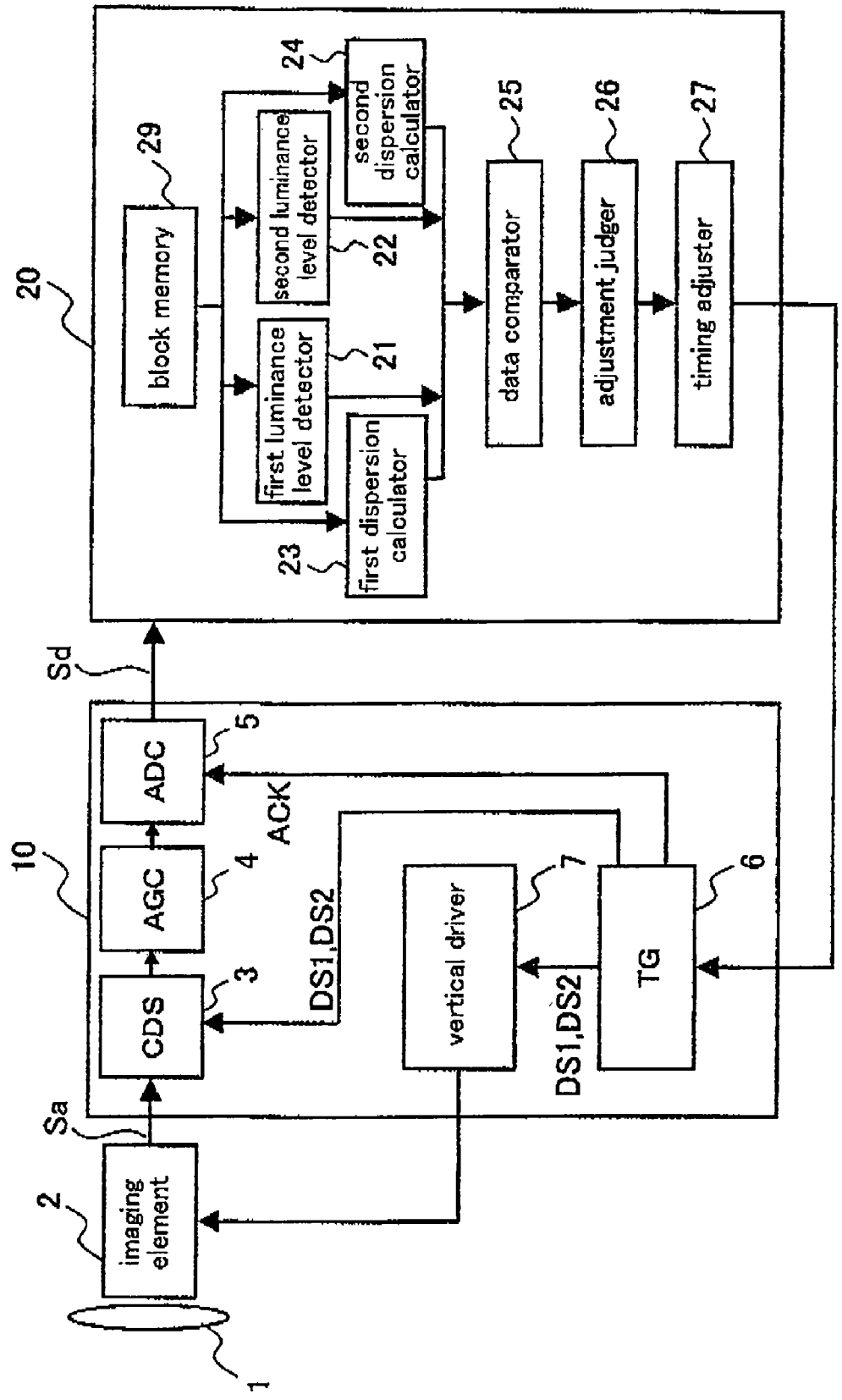
FIG. 10 is a block diagram illustrating an overall constitution of a digital camera according to a preferred embodiment 4 of the present invention.
Figure 11:
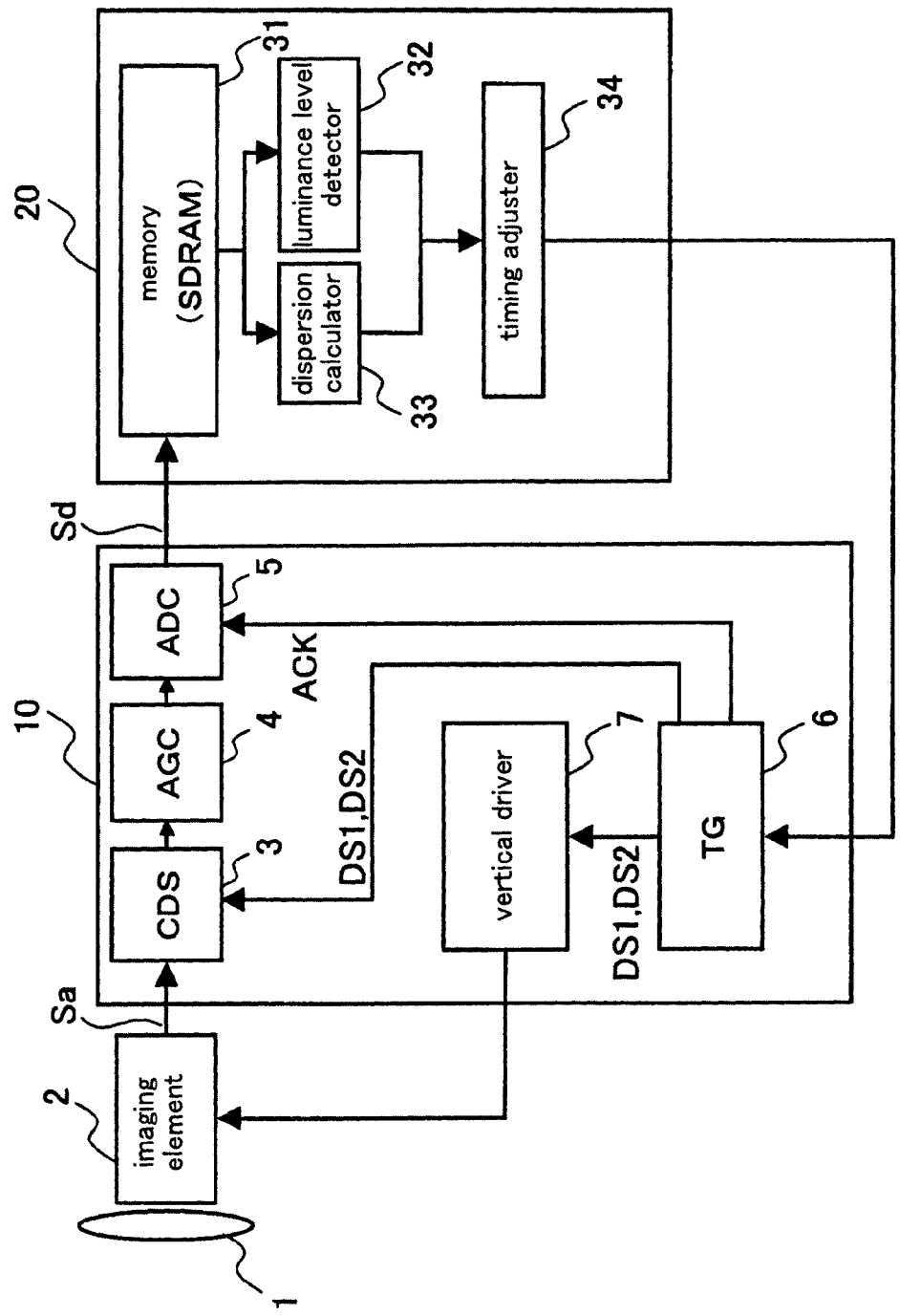
FIG. 11 is a block diagram illustrating a constitution of a conventional digital camera.

A block memory is used in a preferred embodiment 5 of the present invention. FIG. 10 illustrates a constitution of a phase adjustment device in which a block memory 29 is used. The block memory 29 is provided in order to realize such functions as exposure adjustment and auto white balance in a digital still camera. The signals of R pixel, Gr pixel, B pixel, and Gb pixel outputted from the imaging element 2 are inputted to the block memory 29. In the block memory 29 is memorized an integration result or an average result of pixel signals (data) of these R pixel, Gr pixel, B pixel, and Gb pixel. In the block memory 29, blocks constitute the pixel region subject to the calculation, and pixels of m in the horizontal direction×n in the vertical direction constitute one block. m and n are arbitrary natural numbers which are different to the natural number used in the preferred embodiment 1. The block memory 29 integrates the data for each pixel color in one block. Further, the block memory 29 outputs an integration result corresponding to blocks of i in the horizontal direction×j in the vertical direction in a period of time during which one image (frame) is fetched. Further, the block memory 29 outputs the integration result of the R pixel, Gr pixel, B pixel, and Gb pixel corresponding to i blocks when the integration of i blocks is completed.

In the present preferred embodiment, the first and second luminance level detectors 21 and 22 and the first and second dispersion calculators 23 and 24 use the output results of the block memory 29. Therefore, the luminance level and the dispersion can be calculated without SDRAM. In the preferred embodiments 1-4, though not shown, the first and second luminance level detectors 21 and 22 and the first and second dispersion calculators 23 and 24 obtain pixel data from SDRAM.

The present preferred embodiments described thus far are merely examples and can be variously modified within the scope of the gist of the present invention.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A phase adjustment device for adjusting a phase of a pulse used in an imaging element based on a digital imaging signal obtained when an analog imaging signal outputted from the imaging element is converted into a digital value for each pixel, comprising:
   a first luminance level detector for detecting a luminance level of the digital imaging signal obtained from the analog imaging signal outputted from a plurality of pixels in a first pixel region of the imaging element;
   a second luminance level detector for detecting a luminance level of the digital imaging signal obtained from the analog imaging signal outputted from a plurality of pixels in a second pixel region of the imaging element;
   a data comparator for comparing a result of the detection by the first luminance level detector and a result of the detection by the second luminance level detector;
   an adjustment judger for judging if the phase adjustment for the pulse is necessary based on a result of the comparison by the data comparator; and
   a timing adjuster for shifting the phase of the pulse in the second pixel region when the luminance levels are detected, wherein
   the timing adjuster adjusts the phase of the pulse when the judgment by the adjustment judger indicates that the phase adjustment is necessary, and
   the adjustment judger judges a direction in which the phase of the analog imaging signal is shifted and an amount of the phase shift based on a comparison result by the data comparator obtained in a state where the phase of the pulse is set to be optimal for the first pixel region in the first pixel region and the optimum phase of the pulse in the first pixel region is shifted chronologically forward in the second pixel region and a comparison result by the data comparator obtained in a state where the phase of the pulse is set to be optimal for the first pixel region in the first pixel region and the optimum phase of the pulse in the first pixel region is shifted chronologically backward in the second pixel region.

2. The phase adjustment device as claimed in claim 1, further comprising a histogram calculator for detecting a luminance level distribution in the first pixel region and a luminance level distribution in the second pixel region and supplying a result of the detection to the first and second luminance level detectors.

3. The phase adjustment device as claimed in claim 1, further comprising a block memory for storing therein an integration result or an average result of the digital imaging signal obtained from the analog imaging signal outputted from at least one of the first and second pixel regions and supplying the integration result or the average result stored therein to the first and second luminance level detectors.

4. The phase adjustment device as claimed in claim 1, wherein the timing adjuster sets the phase of the pulse to be optimal for the first pixel region in the first pixel region, and sets a phase of the pulse which is shifted from the phase of the pulse in the first pixel region in the second pixel region.

5. The phase adjustment device as claimed in claim 1, wherein the timing adjuster calculates an optimal phase of the pulse when the adjustment judger judges the phase adjustment to be necessary, and indicates the calculated optimal phase to a timing generator which generates the pulse.

6. The phase adjustment device as claimed in claim 1, wherein the pulse is a peak sample pulse for detecting a signal level of the analog imaging signal.

7. The phase adjustment device as claimed in claim 1, wherein the pulse is a reference sample pulse for detecting a signal level which is used as a reference when the analog imaging signal is subjected to correlated double sampling.

8. The phase adjustment device as claimed in claim 1, wherein the timing adjuster makes fine adjustments to the phase of the pulse in the second region every time an image is obtained after the phase of the pulse is fixed in the first pixel region.

9. The phase adjustment device as claimed in claim 1, wherein
   the pulse is a peak sample pulse for detecting a peak level of the analog imaging signal,
   a reference sample pulse for detecting a signal level used as a reference when the analog signal is subjected to correlated double sampling,
   an AD clock signal used when the analog imaging signal is AD-converted, and
   the timing adjuster repeatedly adjusts phases of the peak sample pulse, the reference sample pulse and the AD clock signal.

10. The phase adjustment device as claimed in claim 1, wherein the timing adjuster alternately repeats for each frame an adjustment manner in which the phase of the pulse is set to be optimal for the first pixel region in the first pixel region and the optimum phase of the pulse in the first pixel region is shifted chronologically forward in the second region and an adjustment manner in which the phase of the pulse is set to be optimal for the first pixel region in the first pixel region and the optimum phase of the pulse in the first pixel region is shifted chronologically backward in the second region.

11. The phase adjustment device as claimed in claim 10, wherein the timing adjuster resets the phase of the pulse in accordance with a distribution of the luminance levels or a histogram distribution.

12. The phase adjustment device as claimed in claim 1, wherein, when the luminance level in the first pixel region and the luminance level in the second pixel region are different to each other by at least a first predetermined amount, the timing adjuster shifts the phase of the pulse by a second predetermined amount in a direction in which the luminance levels become equal to each other.

13. The phase adjustment device as claimed in claim 12, wherein the first and second predetermined amounts are set in relation to at least one of respective colors of the analog imaging signal.

14. The phase adjustment device as claimed in claim 12, wherein the pulse is more than one, and the first and second predetermined amounts are different for each of the pulses.

15. The phase adjustment device as claimed in claim 1, wherein the time adjuster does not perform phase adjustment in which a phase goes away from the initial optimal phase of the pulse by a predetermined amount or more.

16. The phase adjustment device as claimed in claim 15, wherein the pulse is more than one, and third predetermined amount is different for each of the pulses.

17. The phase adjustment device as claimed in claim 1, wherein the timing adjuster does not perform the phase adjustment in a state where the luminance levels are beyond a predetermined range.

18. The phase adjustment device as claimed in claim 1, further comprising a timing generator, wherein the timing generator generates first and second reference sample pulses used as references when the analog imaging signal is subjected to the correlated double sampling, first and second peak sample pulses for detecting a signal level of the analog imaging signal and first and second AD clock signals used when the analog imaging signal is AD-converted, in the first and second pixel regions, respectively.

19. A phase adjustment device for adjusting a phase of a pulse used in an imaging element based on a digital imaging signal obtained when an analog imaging signal outputted from the imaging element is converted into a digital value for each pixel, comprising:
   a first dispersion calculator for calculating dispersion showing signal variability of the digital imaging signal obtained from the analog imaging signal outputted from a plurality of pixels in a first pixel region of the imaging element;
   a second dispersion calculator for calculating dispersion showing signal variability of the digital imaging signal obtained from the analog imaging signal outputted from a plurality of pixels in a second pixel region of the imaging element;
   a data comparator for comparing a result of the calculation by the first dispersion calculator and a result of the calculation by the second dispersion calculator;
   an adjustment judger for judging if the phase adjustment for the pulse is necessary based on a result of the comparison by the data comparator; and
   a timing adjuster for shifting the phase of the pulse in the second pixel region when the dispersions are calculated, wherein
   the timing adjuster adjusts the phase of the pulse when the judgment by the adjustment judger indicates that the phase adjustment is necessary, and
   the adjustment judger judges a direction in which the phase of the analog imaging signal is shifted and an amount of the phase shift based on a comparison result by the data comparator obtained in a state where the phase of the pulse is set to be optimal for the first pixel region in the first pixel region and the optimum phase of the pulse in the first pixel region is shifted chronologically forward in the second pixel region and a comparison result by the data comparator obtained in a state where the phase of the pulse is set to be optimal for the first pixel region in the first pixel region and the optimum phase of the pulse in the first pixel region is shifted chronologically backward in the second pixel region.

20. The phase adjustment device as claimed in claim 2, further comprising a histogram calculator for detecting a luminance level distribution in the first pixel region and a luminance level distribution in the second pixel region and supplying a result of the detection to the first and second dispersion calculators.

21. The phase adjustment device as claimed in claim 19, further comprising a block memory for storing therein an integration result or an average result of the digital imaging signal obtained from the analog imaging signal outputted from at least one of the first and second pixel regions and supplying the integration result or the average result stored therein to the first and second dispersion calculators.

22. The phase adjustment device as claimed in claim 19, wherein the timing adjuster sets the phase of the pulse to be optimal for the first pixel region in the first pixel region, and sets a phase of the pulse which is shifted from the phase of the pulse in the first pixel region in the second pixel region.

23. The phase adjustment device as claimed in claim 19, wherein the timing adjuster calculates an optimal phase of the pulse when the adjustment judger judges the phase adjustment to be necessary, and indicates the calculated optimal phase to a timing generator which generates the pulse.

24. The phase adjustment device as claimed in claim 19, wherein the pulse is a peak sample pulse for detecting a signal level of the analog imaging signal.

25. The phase adjustment device as claimed in claim 19, wherein the pulse is a reference sample pulse for detecting a signal level which is used as a reference when the analog imaging signal is subjected to correlated double sampling.

26. The phase adjustment device as claimed in claim 19, wherein the timing adjuster makes fine adjustments to the phase of the pulse in the second region every time an image is obtained after the phase of the pulse is fixed in the first pixel region.

27. The phase adjustment device as claimed in claim 19, wherein
   the pulse is a peak sample pulse for detecting a peak level of the analog imaging signal, a reference sample pulse for detecting a signal level used as a reference when the analog signal is subjected to correlated double sampling, and an AD clock signal used when the analog imaging signal is AD-converted, and
   the timing adjuster repeatedly adjusts phases of the peak sample pulse, the reference sample pulse and the AD clock signal.

28. The phase adjustment device as claimed in claim 19, wherein the timing adjuster alternately repeats for each frame an adjustment manner in which the phase of the pulse is set to be optimal for the first pixel region in the first pixel region and the optimum phase of the pulse in the first pixel region is shifted chronologically forward in the second region and an adjustment manner in which the phase of the pulse is set to be optimal for the first pixel region in the first pixel region and the optimum phase of the pulse in the first pixel region is shifted chronologically backward in the second region.

29. The phase adjustment device as claimed in claim 28, wherein the timing adjuster resets the phase of the pulse in accordance with a distribution of the luminance levels or a histogram distribution.

30. The phase adjustment device as claimed in claim 19, wherein, when a luminance level in the first pixel region and a luminance level in the second pixel region are different to each other by at least a first predetermined amount, the timing adjuster shifts the phase of the pulse by a second predetermined amount in a direction in which the luminance levels become equal to each other.

31. The phase adjustment device as claimed in claim 30, wherein the first and second predetermined amounts are set in relation to at least one of respective colors of the analog imaging signal.

32. The phase adjustment device as claimed in claim 30, wherein the pulse is more than one, and the first and second predetermined amounts are different for each of the pulses.

33. The phase adjustment device as claimed in claim 19, wherein the time adjuster does not perform phase adjustment in which a phase goes away from the initial optimal phase of the pulse by a predetermined amount or more.

34. The phase adjustment device as claimed in claim 33, wherein the pulse is more than one, and a third predetermined amount is different for each of the pulses.

35. The phase adjustment device as claimed in claim 19, wherein the timing adjuster does not perform the phase adjustment in a state where the luminance levels are beyond a predetermined range.

36. The phase adjustment device as claimed in claim 19, further comprising a timing generator, wherein the timing generator generates first and second reference sample pulses used as references when the analog imaging signal is subjected to the correlated double sampling, first and second peak sample pulses for detecting a signal level of the analog imaging signal and first and second AD clock signals used when the analog imaging signal is AD-converted, in the first and second pixel regions, respectively.

37. A digital camera comprising:
the phase adjustment device claimed in claim 1;
the imaging element; and
a lens for collecting light on the imaging element.

38. A digital camera comprising:
the phase adjustment device claimed in claim 19;
the imaging element; and
a lens for collecting light on the imaging element.

* * * * *